(12) United States Patent
Ogawa et al.

(10) Patent No.: US 6,603,506 B2
(45) Date of Patent: *Aug. 5, 2003

(54) DIGITAL IMAGE-SENSING APPARATUS AND CONTROL METHOD THEREFOR

(75) Inventors: Yasuyuki Ogawa, Tokyo (JP); Hitoshi Watanabe, Yokohama (JP); Satoshi Asada, Inagi (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/791,843

(22) Filed: Jan. 30, 1997

(65) Prior Publication Data

US 2002/0080250 A1 Jun. 27, 2002

(30) Foreign Application Priority Data

| Feb. 2, 1996 | (JP) | 8-017607 |
| Mar. 13, 1996 | (JP) | 8-055967 |
| Jun. 12, 1996 | (JP) | 8-150956 |
| Jun. 12, 1996 | (JP) | 8-150957 |
| Jan. 24, 1997 | (JP) | 9-011551 |

(51) Int. Cl.$^7$ .................................................. H04N 5/225
(52) U.S. Cl. ........................... 348/207.2; 348/231.6; 348/220.1
(58) Field of Search ................................ 348/222, 231, 348/232, 233, 552, 348, 222.1, 231.99, 231.3, 231.6, 231.9; 358/906; 400/88; 355/39, 40

(56) References Cited

U.S. PATENT DOCUMENTS

| 4,903,068 | A | * | 2/1990 | Shiota ........................ 358/512 |
| 5,267,800 | A | * | 12/1993 | Petteruti et al. .............. 400/88 |
| 5,412,779 | A | * | 5/1995 | Motoyama ..................... 399/8 |
| 5,447,827 | A | * | 9/1995 | Ishikawa et al. ............... 355/39 |
| 5,477,264 | A | * | 12/1995 | Sarbadhikari et al. ...... 348/231 |
| 5,481,656 | A | * | 1/1996 | Wakabayashi et al. ....... 395/115 |
| 5,550,646 | A | * | 8/1996 | Hassan et al. .............. 358/442 |
| 5,566,278 | A | * | 10/1996 | Patel et al. .................. 395/114 |
| 5,727,135 | A | * | 3/1998 | Webb et al. ................. 395/113 |
| 5,739,897 | A | * | 4/1998 | Frick et al. .................... 355/40 |
| 5,767,945 | A | * | 6/1998 | Fields et al. .................. 355/39 |
| 5,786,904 | A | * | 7/1998 | Narita ........................ 358/487 |
| 5,818,603 | A | * | 10/1998 | Motoyama .................. 358/296 |
| 5,999,276 | A | * | 12/1999 | Narita ........................ 358/487 |
| 6,111,605 | A | * | 8/2000 | Suzuki ........................ 348/220 |

* cited by examiner

*Primary Examiner*—Tuan Ho
(74) *Attorney, Agent, or Firm*—Morgan & Finnegan, LLP

(57) ABSTRACT

A digital image sensing apparatus having a plurality of programs for connecting the apparatus to a plural types of external device. When sensed video image data is transferred to the external device, the characteristic of the external device is obtained so that the video image data can be converted into data in form receivable and interpretable by the external device. An application program is selected in accordance with the obtained characteristic, then the video image data is converted in accordance with the selected program, and the converted video image data is outputted to the external device.

3 Claims, 15 Drawing Sheets

FIG. 2

| PRINTER TYPE | RESOLUTION | | PROGRAM |
|---|---|---|---|
| | HORIZONTAL | VERTICAL | |
| a101 | 600 | 600 | a101.exe |
| a102 | 360 | 360 | a202.exe |
| b101 | 720 | 720 | b101.exe |

20a    20b    20c    20d    20

DIGITAL IMAGE-SENSING APPARATUS AND CONTROL METHOD THEREFOR

BACKGROUND OF THE INVENTION

This invention relates to a digital image-sensing apparatus which converts an optical image, obtained by sensing an object, into an electric video signal, then converts the electric video signal into a digital video signal so that an external printer can print the sensed image based on the digital video signal.

In conventional digital image-sensing devices such as a digital camera, to print a sensed image, it is necessary to once download image data into a computer machine such as a personal computer (PC), then output the data to a printer connected to the computer machine by using an application program for performing printing based on the data.

In this technique, a user searches a table of image information and file names displayed on a display device by using the application on the computer machine, and selects output data for printing.

However, this technique must use a computer machine to print a digital image sensed by an image-sensing device such as a digital camera. For this reason, the user who desires to see a printed sensed image must activate an application program to download the digital image data stored in the image-sensing device, and an application program to perform printing based on the data, then operate the programs. In addition, only the printer connected to the computer machine can perform printing.

SUMMARY OF THE INVENTION

The present invention has been made to solve the above problems, and has its object to provide a digital image-sensing apparatus which enables image sensing utilizing portability and enables an external printer to easily print a sensed image.

Another object of the present invention is to provide an image-sensing apparatus which automatically recognizes an external device upon transferring sensed video image data to the external device, and generate and output data in format interpretable by the external device, and the external device.

Further object of the present invention is to provide an image sensing apparatus which add decorative information to the sensed video image data, and causes an external device, especially a printer, to print a sensed image not only simply based on sensed video image data, but also based on the video image data with the decorative information.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 shows a printer-type management table managed by an image-sensing apparatus of the first embodiment;

DETAILED DESCRIPTION OF THE PREFERRED EMBODIMENTS

Preferred embodiments of the present invention will now be described in detail in accordance with the accompanying drawings.

Note that the present invention is implemented by a system having a digital image-sensing apparatus which comprises a CPU, a memory, a storage device, and an interface unit for communication with a printer, and a communication-protocol management module which discriminates a printer connected to the system and manages the communication protocol, a sample-table generating module which generates a table of stored image data, and a printer-control code generating module which generates printer-control codes.

The above system enables searching and selection of information on paper by using a printer, instead of conventional search and selection made on a display device of a computer machine.

In the above system, a user selects an image to be printed from a printed sample image table, and instructs the printer directly from the digital image-sensing apparatus to perform printing.

Next, the embodiments of the present invention will be described in detail.

[First Embodiment]

Figure 1:
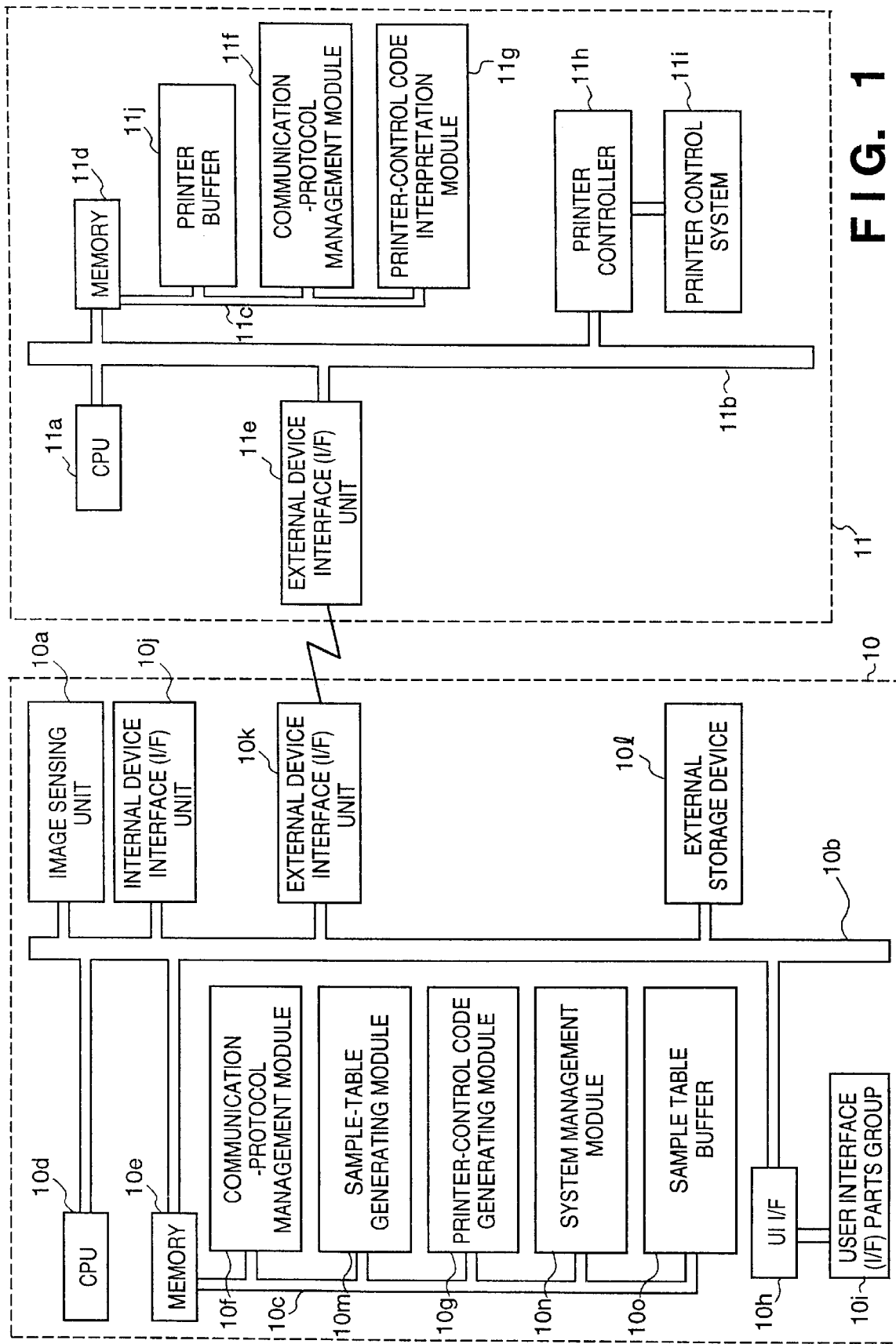
FIG. 1 is a block diagram showing the construction of an image-sensing and printing system according to a first embodiment of the present invention.

FIG. 1 shows the construction of the image-sensing and printing system according to a first embodiment of the present invention. In this construction, an image-sensing apparatus main body 10 comprises an image sensing unit 10a, a CPU 10d, a memory 10e, a user interface (I/F) parts group 10i, a user interface (I/F) unit 10h, an internal-device interface (I/F) unit 10j, an external-device interface (I/F) unit 10k, an external storage device 10l, and a system bus 10b and a local bus 10c connecting the-respective elements.

Note that the user I/F parts group 10i includes a display (liquid crystal display) device for displaying a sensed video image and simple messages, and various buttons such as a shutter button used for image-sensing, a print button used for printing, and a selection button for selecting items displayed on the display device.

The image-sensing apparatus main body 10 is communicable with a printer 11 via the external-device I/F unit 10k. In the memory 10e, storage areas are allocated to a communication-protocol management module 10f for managing communication protocol with the printer 11, a sample-table generating module 10m for generating a sample image table of a plurality of image data stored in the external storage device 10l, a print-control code generating module 10g for generating printer-control codes, a system management module 10n for managing the overall image sensing apparatus 10, and a sample table buffer 10o for storing the sample image table.

The printer-control code generating module 10g has a printer-type management table 20 as shown in FIG. 2. The printer-type management table 20 contains a printer-type logical name 20a, a printer horizontal resolution 20b, a printer vertical resolution 20c, and a printer driver program 20d.

In the image-sensing and printing system, when the shutter button in the user I/F parts group 10i is pressed, video image data obtained by sensing by the image sensing unit 10a is stored, as digital image data, into the external storage device 10l in the form of image file. In the present embodiment, upon storing data into the external storage device 10l, image data obtained from image sensing is compressed by a method in accordance with the JPEG (Joint Photographic Coding Experts Group) standards.

On the other hand, the printer 11 comprises a CPU 11a, a memory 11d, a printer-control system 11i, a printer controller 11h, an external-device interface (I/F) unit 11e, and a system bus 11b and a local bus 11c connecting the respective elements.

In the memory 11d, storage areas are allocated to a communication-protocol management module 11f for managing a communication protocol with the image-sensing apparatus 10, a print buffer 11j for storing the printer-control codes transferred from the image-sensing apparatus 10, and a printer-control code interpretation module 11g for interpreting the printer-control codes.

In the present embodiment, the system management module 10n in the memory 10e always manages messages from the image sensing unit 10a, the internal-device I/F unit 10j, the external-device I/F unit 10k, and the user I/F unit 10h.

The communication-protocol management module 10f manages signals inputted/outputted to/from the external-device I/F unit 10k, i.e., communication with the printer 11.

In the present embodiment, the communication system between the image-sensing apparatus main body 10 and the printer 11 can be constructed either a wired-communication system or a wireless-communication system.

To perform communication between the image-sensing apparatus main body 10 and the printer 11, it is necessary to first establish a communication link. The communication at this stage is performed by the communication-protocol management module 10f in the memory 10e of the image sensing apparatus 10 and the communication-protocol interpretation module 11f in the memory 11d of the printer 11. The operation and processing to generate a sample image table by using the protocol during this communication will be described with reference to FIGS. 2 to 4.

Figure 3:
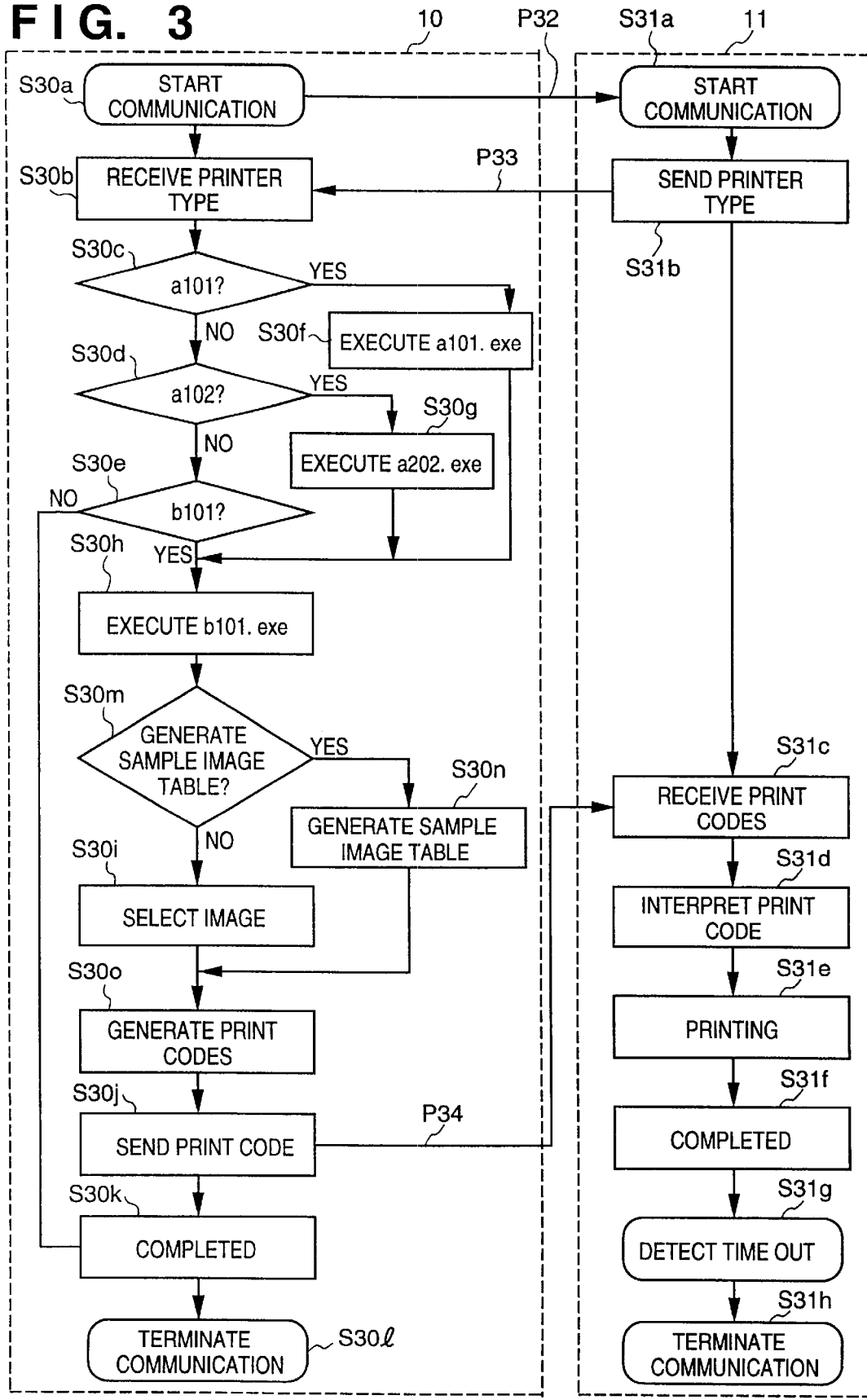
FIG. 3 is a flowchart showing a communication protocol between the image-sensing apparatus and a printer of the first embodiment and process procedures on both sides.
Figure 4:
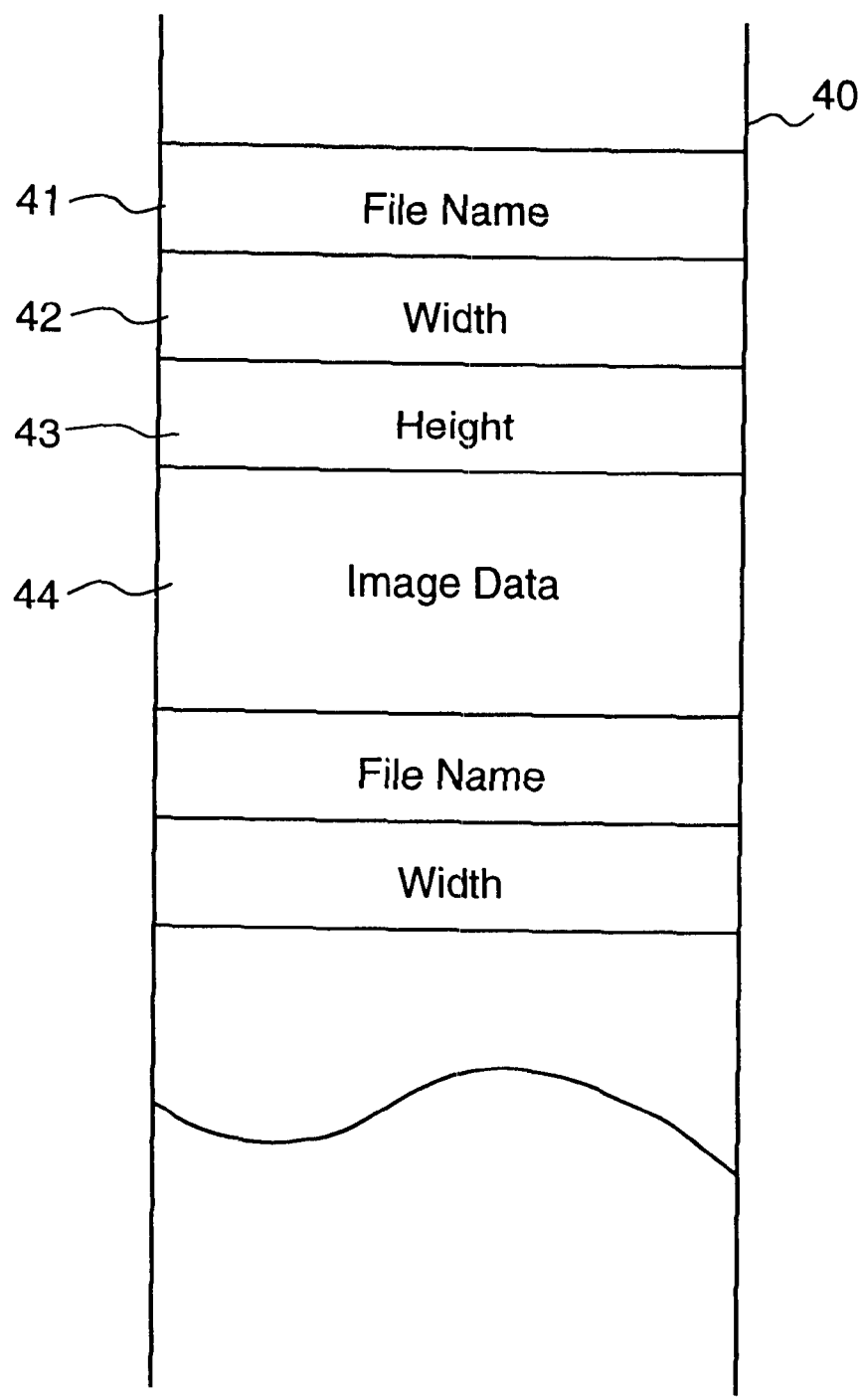
FIG. 4 shows the structure of sample table data in a memory of the image-sensing apparatus of the first embodiment.

FIG. 2 shows the printer-type management table 20. FIG. 3 shows the communication protocol between the image sensing apparatus 10 and the printer 11 and process procedures on both sides. FIG. 4 shows the structure of sample table data in the memory 10e of the image-sensing apparatus 10.

In FIG. 3, the process starts when the print button in the user I/F parts group 10i is pressed.

First, the image sensing apparatus 10 and the printer 11 both start negotiation (P32) as shown in FIG. 3 to establish a communication link between them by using the communication-protocol management modules 10f and 11f, and the image sensing apparatus 10 becomes print-communication start status (step S30a), at which the printer-control code generating module 10g is started. Similarly, the printer 11 becomes print-communication start status (step S31a), at which the printer-control code interpretation module 11g is started.

At step S31a, the printer 11 sends printer-type information to the image sensing apparatus 10 by using the communication-protocol management module 11f (P33).

At step S30b, the image sensing apparatus 10 receives the printer-type information by the communication-protocol management module 10f, and determines a program to generate printer-control codes by using the printer-type management table 20. In the present embodiment, in the printer-type management table 20 in FIG. 2, as three printer types a101, a202 and a b 101 are registered, the printer type is discriminated (steps S30c to S30e) based on the printer-type information from the printer 11, and processing (any of steps S30f to S30h) corresponding to the printer type is performed. If the printer type informed from the printer 11 is not registered in the printer-type management table 20, the printer-control code generating module 10g on the image sensing apparatus 10 side is terminated (S30k), and the communication with the printer 11 is terminated (S30l) by the communication-protocol management module 10f. At this time, the display device in the user I/F parts group 10i displays an error message.

On the image sensing apparatus 10 side, image data obtained from image sensing is stored into the external storage device 10l sequentially. The printer-control code generating module 10g, that has executed a print-code generating program corresponding to the printer type, displays a menu message requesting a print mode on the display device in the user I/F parts group 10i, then waits for data-input for data transfer to the printer 11. If the user of the image sensing apparatus 10 selects to print a sample image table by using the use I/F parts group 10i, the system management module 10n receives a sample-table generation message (step S30m). The process proceeds to step S30n at which the sample-table generating module 10m in the memory 10e is started.

The sample-table generating module 10*m* generates sample table data having a size corresponding to the resolution (20*b* and 20*c* in FIG. 2) obtained from the printer-type management table 20 in the initial communication with the printer 11. More specifically, the sample-table generating module 10*m* loads the respective image data stored in the external storage device 10*l*, and performs interpolation or thinning on the loaded data in accordance with the determined image size. As shown in FIG. 4, a data structure 40, comprising a file name 41, a width 42 and a height 43 with respect to each image, is sequentially stored into the sample table buffer 10*o* in the memory 10*l*, for forming the sample image table.

Figure 6:
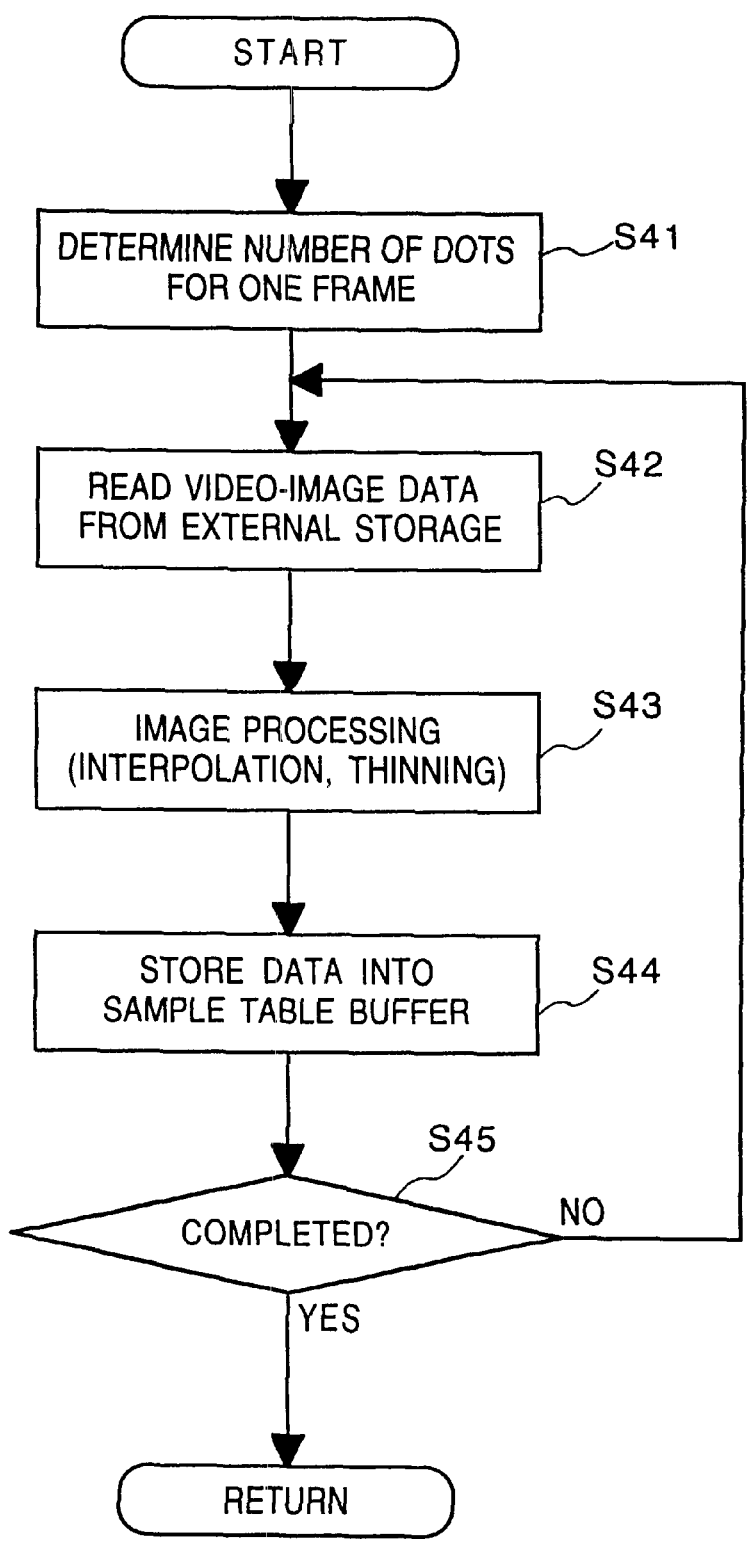
FIG. 6 is a flowchart showing a process procedure of generating sample-table print data according to the first embodiment.

Next, the process procedure of the sample-table generating module 10*m* (step S30*n*) will be described in detail with reference to the flowchart of FIG. 6.

The printing of sample image table is to print a plurality of images, based on the plurality of image data stored in the external storage device 10*l*, on one print sheet. For this purpose, the determination of the size of each image (frame), i.e., the number of dots in a horizontal direction and that in a vertical directions, determined based on each corresponding video image data, is important. To obtain a constant image size regardless of the printer connected to the image sensing apparatus, the number of dots in the horizontal direction and the vertical direction of each image to be generated must be determined in accordance with the resolution of the printer.

At step S41, since the printer type is known by the communication-protocol management module 10*f*, the number of dots in the horizontal direction and that in the vertical direction of one image is determined based on the resolution of the printer. If the resolution of the connected printer is high, the number of the dots in the horizontal and vertical directions increases; contrary, if the resolution is lower, the number of dots decreases.

At step S42, one video image data (data for one image) is read from the external storage device 10*l*, and the data is decoded. At step S43, the read video image data is interpolated or thinned to have the above-determined number of dots.

Generally, a CCD used in digital image-sensing devices and the like has at most 300,000 to 400,000 pixels, and image data obtained from image sensing has about 640×480 dots. However, recent printers have a higher resolution (e.g., 720 dpi). Printing a sample image table using such printers, without any processing, results in a very small table. For this reason, interpolation rather than thinning is actually performed. As interpolation is well-known technique, the explanation of this processing will be omitted.

Thus, when image data for one frame of the sample image table has been generated, the data having the format as shown in FIG. 4 is stored in the sample table buffer 10*o*.

The processing at step S42 and the subsequent steps is repeated until it is determined at step S45 that generation of sample-table print data for all the stored image data has been completed.

Returning to FIG. 3, the printer-control code generating module 10*g*, that has received image data 44 and the file name 41 from the sample table data generated by the sample-table generating module 10*m*, converts the image data 44 and the file name 41 into print codes that the printer can interpret by using the selected program (S30*o*).

At step S30*j*, the image sensing apparatus 10 sends the generated print codes to the printer 11 (P34), and as the transfer has been completed, the printer-control code generating module 10*g* is terminated (S30*k*). Then, the communication-protocol management module 10*f* terminates the communication with the printer 11 (S30*l*).

On the printer 11 side, the printer codes are received from the image sensing apparatus 10 by the communication-protocol management module 11*f* (step S31*c*). The received codes are temporarily stored via the external-device I/F unit 11*e* into the print buffer 11*j* in the memory 11*d*. The stored codes are loaded into the CPU 11*a* and interpreted (step s31*d*). Printing is performed by the printer controller 11*h* and the printer control system 11*i* (step S31*e*). As the printing has been completed, the printer-control code interpretation module 11*g* is terminated (step S31*f*). The communication-protocol management module 11*f* detects by time out that data transfer from the image sensing apparatus 10 has not been made (step S31*g*), and terminates the communication (S31*h*).

Note that if the sample table data has not been received (NO at step S30*m*), and an image file has been directly selected (S30*i*), the image sensing apparatus 10 generates print codes by using the selected program and sends the print codes to the printer 11 (P34).

Next, the processing by step S30*i* will be described in detail with reference to the flowchart of FIG. 7.

First, a variable i is initialized to "1" at step S51. Next, the i-th sensed video image data from the external storage device 10*l*, and appropriate thinning is performed on the read data. A sensed video image is displayed on the display device in the user I/F parts group 10*i*, based on the data.

The user looks at the displayed video image, and by manipulating the various buttons in the user I/F parts group 10*i*, instructs to or not to print, or performs frame feed operation or frame feed-back operation.

Upon frame feed instruction, the process proceeds from step S53 to S54, at which the variable i is incremented by "1", then returns to step S52. As a result, the display device displays the next frame (sensed video image).

On the other hand, upon frame feed-back instruction, the process proceeds from step S55 to S56, at which the variable i is decremented by "1", then the returns to step S52.

In this manner, when the user finds a video image to be printed, the user instructs printing. In this case, the process proceeds from step S57 to S58, at which the number of dots in the horizontal direction and that in the vertical direction is determined in accordance with the resolution of the currently connected printer, so that image printing is performed based on the currently selected i-th video image data in an appropriate image size (larger than the size of frames in the printed sample image table). The process proceeds to step S59, at which interpolation is performed on the data to have the determined number of dots in the horizontal direction and that in the vertical direction. At step S60, the processed image data is stored into the sample table buffer 10*o*, and the process ends.

In the above-described sample table printing, the plurality of video image data are stored into the sample table buffer 10*o*, however, in case of printing only one frame, only one print data is stored into the sample table buffer 10*o*.

Figure 7:
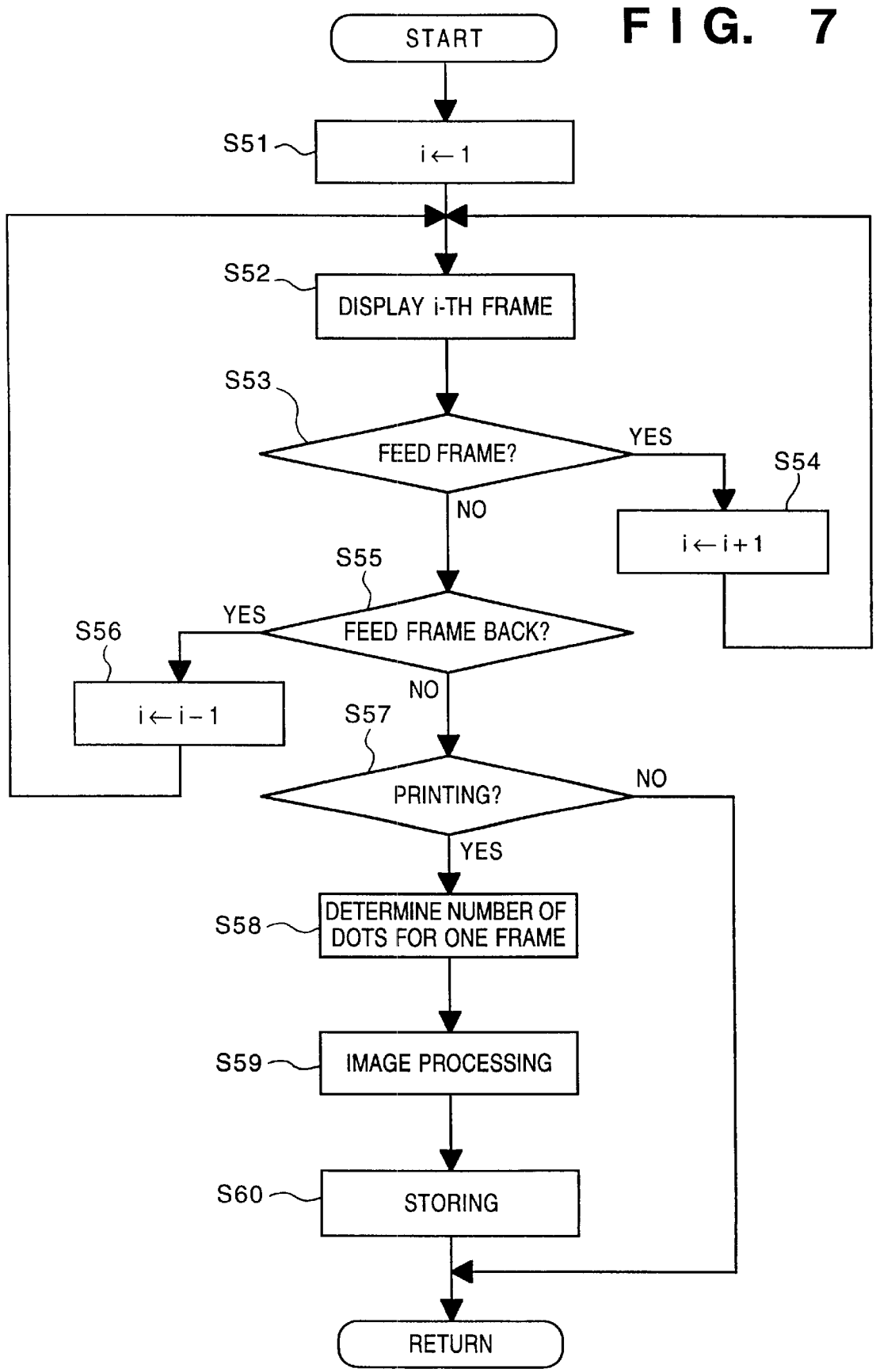
FIG. 7 is a flowchart showing a process procedure of generating print data of a sensed video image according to the first embodiment.

Further, in FIG. 7, the video image to be printed is displayed one after another. In a case where a sample image table has been previously printed, each frame has its file name. Therefore it may be arranged such that a list of file names is displayed. In this case, in the flowchart of FIG. 7, instead of displaying one frame video image at a time at step S52, the file name of the i-th file stored in the external storage device 10*l* can be displayed. As a result, the display device merely displays numerals and characters, which reducing costs.

Figure 5:
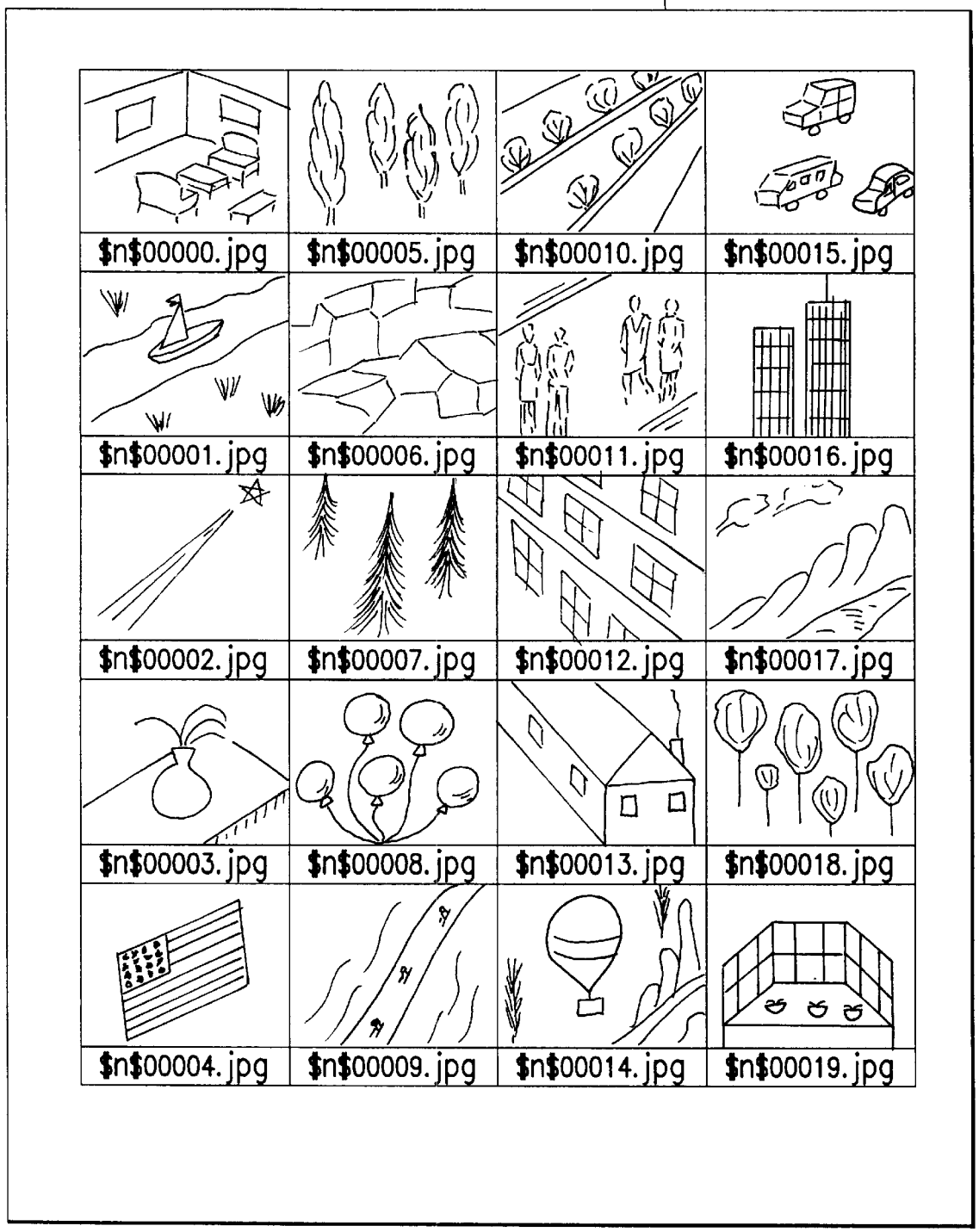
FIG. 5 shows a sample image table printed in the first embodiment.

FIG. 5 shows an example of printed sample image table.

[Second Embodiment]

In the system of the first embodiment, after a message instructing to generate a sample image table has been received from the user, the sample image table is generated based on image data. However, it may be arranged such that, upon image sensing, data for the sample image table is generated besides the sensed image data. In this system, after reception of the message instructing to generate a sample image table, search is performed on the data for a sample image table, and print data of the sample image table is generated from the image data obtained from the search.

[Third Embodiment]

In the above systems, after reception of a message instructing to generate a sample image table, the sample image table is generated based on image data, however, it may be arranged such that once-generated sample-table data is saved as a sample-table file. In this case, the sample image table can be printed by directly designating the sample-table file by name or ID and the like.

As described above, according to the first to third embodiments, a digital image sensing apparatus can prints a sensed image by directly controlling a printer connected to the image sensing apparatus. Further, it is possible to provide search means which functions similar to a printing environment using a computer machine. This realizes image sensing, searching and print environment utilizing portability as the feature of the image sensing apparatus.

[Fourth Embodiment]

In the first to third embodiments, video image data obtained by sensing by the image sensing apparatus is outputted to a printer connected to the image sensing apparatus as an external device, however, the external device is not limited to the printer.

In the following embodiment, video image data can be outputted to either a printer or a facsimile apparatus. That is, if the image sensing apparatus is connected to a printer, printing is performed similarly to the first embodiment, while if the image sensing apparatus is connected to a facsimile apparatus, video image data is sent to the facsimile apparatus via facsimile transmission.

Figure 8:
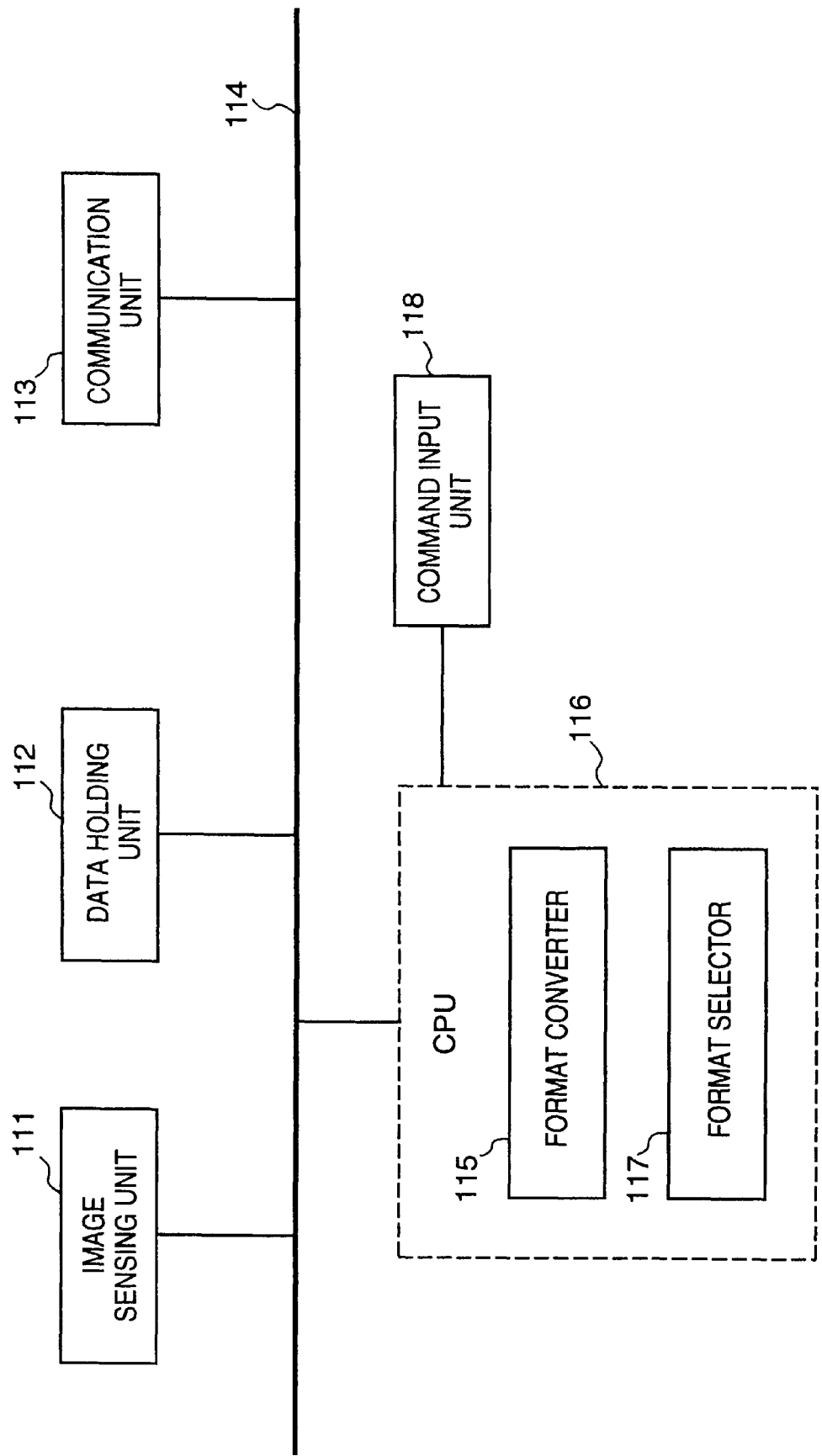
FIG. 8 is a block diagram showing the construction of a camera according to a fourth embodiment.

FIG. 8 shows the construction of a camera according to a fourth embodiment of the present invention.

In FIG. 8, an image sensing unit 111, a data holding unit 112, a communication unit 113, and a CPU 116 are connected to each other via a bus 114. The CPU 116 includes a format converter 115 and a format selector 117, for converting the format of image data. The CPU 116 is connected to a command-input unit 118 for inputting various commands from a user of the camera and forwards the commands to the CPU 116.

Figure 9:
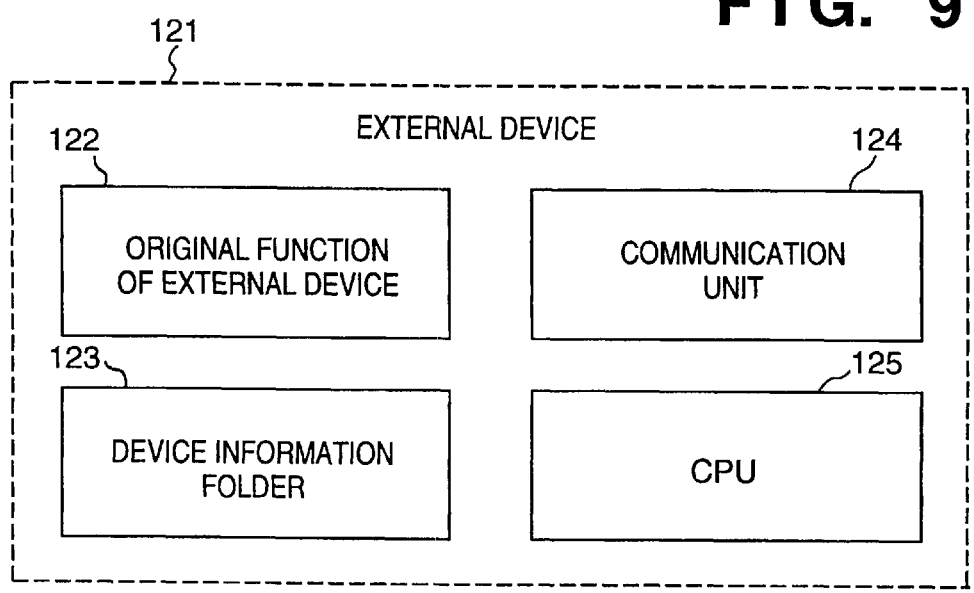
FIG. 9 is a block diagram showing the construction of the external device of the fourth embodiment.

FIG. 9 shows the construction of an external device (printer or facsimile apparatus) 121 as an image processing apparatus which receives image data from the camera. In FIG. 9, in addition to an original function 122 of the external device, a device information holder 123 holding device information, (including format information) to be described later, of the external device 121 is provided. A communication unit 124 is an original constituent of the external device 121, but the communication unit 124 is also used for transfer of device information. Also, a CPU 125 is an original constituent of the external device 121.

Figure 10:
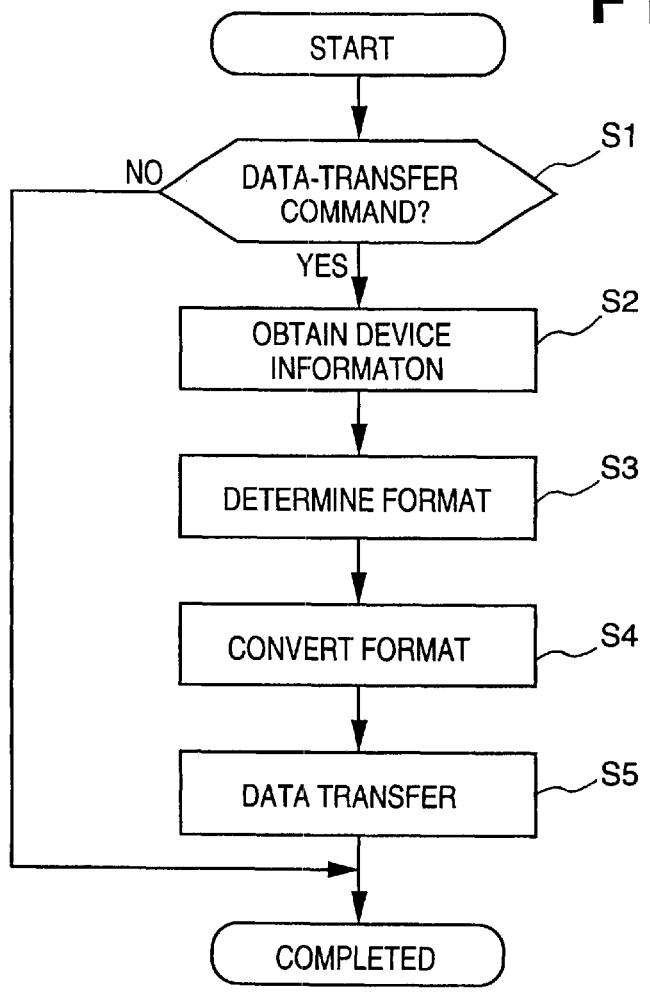
FIG. 10 is a flowchart showing a process procedure according to the fourth embodiment.

FIG. 10 shows a process procedure in the camera. In FIG. 10, description is made on the assumption that image data obtained by sensing by the image sensing unit 111 is stored in the data holding unit 112 (e.g., a memory card and a hard disk).

At step S1, it is determined whether or not a data-transfer request command has been received from the user of the camera via the command-input unit 118. A data-transfer request command from the user is inputted from the command-input unit 118 and forwarded to the CPU 116. As the data-transfer request command form the user has been inputted, the process proceeds to step S2.

Figure 11:
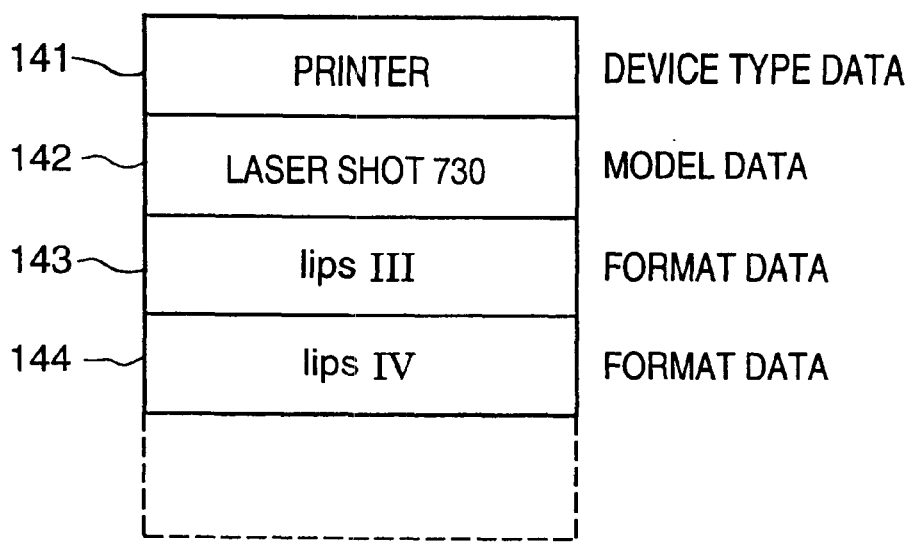
FIG. 11 is an example of device information transferred between the camera and the external device of the fourth embodiment.

At step S2, communication is performed with the external device 121 connected to the camera, and device information is obtained from the external device 121. More specifically, the CPU 116 sends a device-information request command via the communication unit 113 and the bus 114 to the external device 121. On the external device 121 side, the CPU 125 receives the device-information request command from the camera via the communication unit 124, and reads device information of the external device 121 and format information on image data format from the device-information holder 123. The CPU 125 transfers the read device information and format information via the communication unit 124 to the camera. FIG. 11 shows an example of device information. In FIG. 11, the device information includes device type data 141, which indicates the type of the external device, e.g., whether it is a printer or a facsimile, model data 142 indicating the model of the external device, format data 143 indicating the format of page description language or image data format, and format data 144 indicating the format of facsimile communication.

Note that FIG. 11 shows the device information when the external device is a printer. In case of a facsimile apparatus, the device information as shown in FIG. 12 is used.

Figure 12:
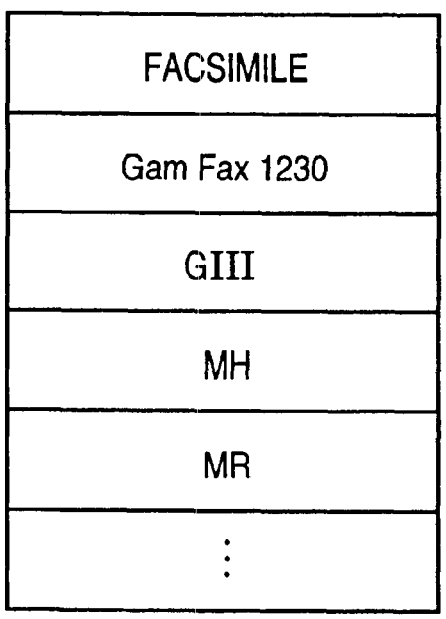
FIG. 12 is an another example of the apparatus information transferred between the camera and the external device of the fourth embodiment.

That is, the device information in FIG. 12 includes device type data indicating the type of the device, e.g., whether it is a facsimile or a printer, model data indicating the model of the external device, and data format data indicating data format in communication.

In FIG. 11, it is indicated by the format data 143 and 144 that data to be transferred must be described in page description language LIPS III or LIPS IV. In FIG. 12, it is indicated that data transfer must be performed by using the MH or MR coding.

At step S3, the device information obtained at step S2 is read into the format selector 117 via the bus 114, and the format of the image data to be transferred is determined. In a case where the external device can process a plurality of formats, the device information obtained at step S2 includes a plurality of format data. Accordingly, an appropriate format is selected from the plurality of format data. The basic format is selected from "image quality" and "transfer speed" by the user in advance. If the device information includes only one format data, that format is employed. In the processing at step S3, if the external device is a printer, it is determined that the image data must be converted to data in printer-processible description language, while if the external device is a facsimile apparatus, it is determined that the image data must be converted to facsimile-processible data.

At step S4, the image data is converted to the format determined at step S3. More specifically, the image data held in the data holding unit 112 is read via the bus 114 into the format converter 115, and converted into the desired format data. Note that the present embodiment performs the format conversion by software under the control of the CPU 116, however, it may arranged such that the format converter 115 is realized by a hardware, and the format conversion is performed by the hardware.

At step S5, the image data format-converted at step S4 is outputted to the communication unit 113 via the bus 114, and transferred to the external device via the communication unit 113. When the data transfer has been completed, the completion of data transfer is notified from the communication unit 113 to the CPU 116. Then the CPU 116 displays a message indicating the completion of the data transfer on a display panel (not shown).

Note that in the present embodiment, a passive device such as a printer or a facsimile apparatus is used as the external device which is an image-data transfer destination, however, by utilizing the fact that the determination of image format is made based on the device information from the external device, an active device such as a PC can be used to designate the desired format, of the device information to be sent to the camera, and the image data in the designated format can be transferred from the camera to the external device. This enables the user to obtain image data obtained by sensing by the camera in the image format designated by the user without considering of the data format of the camera.

Note that if the external device 121 is a facsimile apparatus, it is required to call a destination apparatus. In the present embodiment, it is assumed that the external device 121 which is a facsimile apparatus makes a call to the destination apparatus first, then after the communication link has been established between the external device 121 and the destination apparatus, data is transmitted to the external device so that the external device can transmit the received and coded data to the destination apparatus. In a case where the facsimile apparatus has an external storage device such as a hard disk, the data can be transferred to the external storage device in advance, and the facsimile apparatus can call the destination apparatus.

As described above, according to the fourth embodiment, the data format of image data obtained by sensing by the camera can be automatically converted in accordance with the format of the external device. This omits format conversion by using a computer machine such as a PC. Further, as image format that the external device can process can be automatically selected, the user of the camera can perform image sensing without considering the image format of the camera.

Further, the image processing apparatus (121) of the present invention can request the camera to send image data in the format that the image processing apparatus can process.

[Fifth Embodiment]

Next, a fifth embodiment of the present invention will be described.

Figure 13:
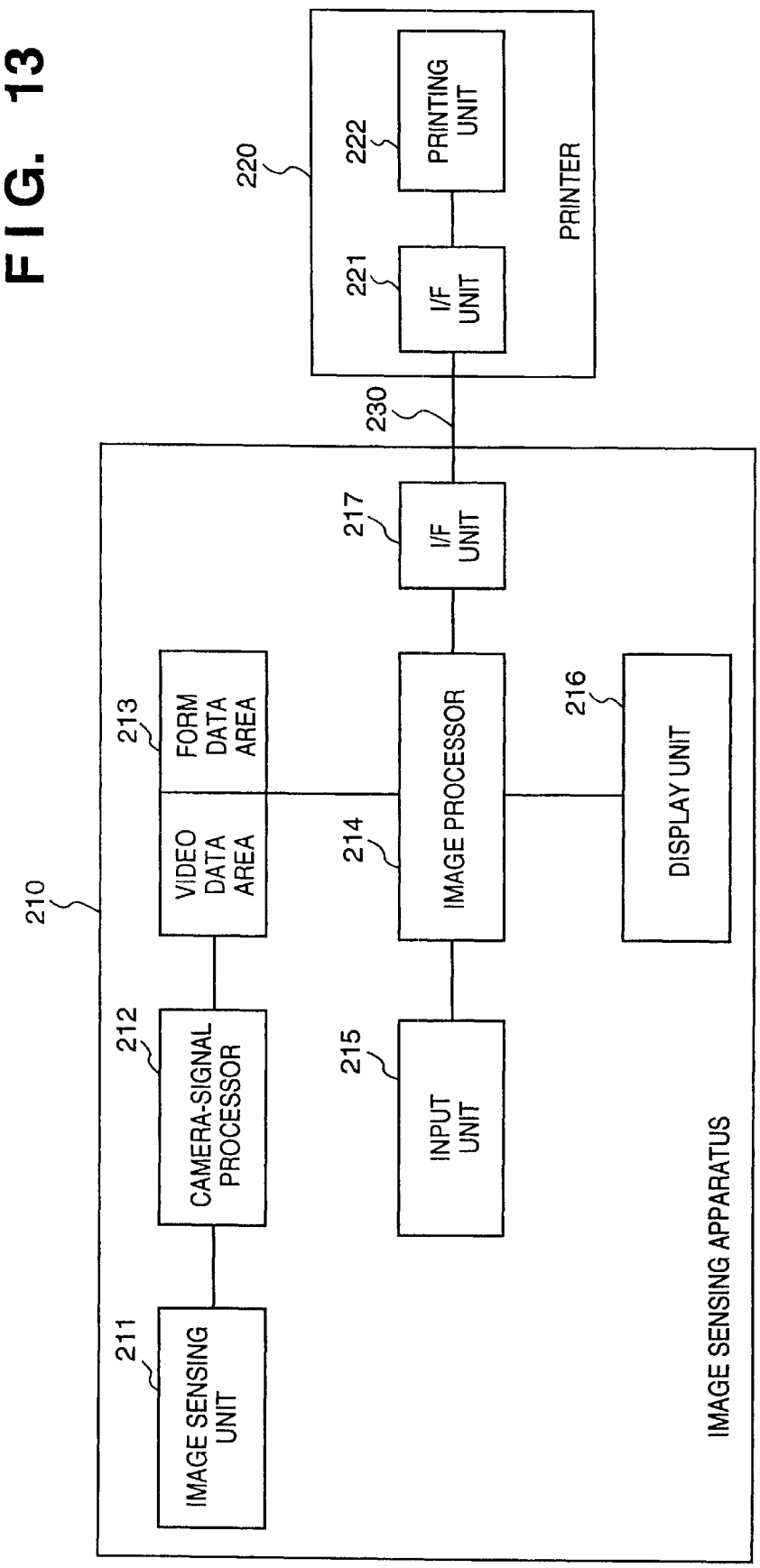
FIG. 13 is a block diagram showing the construction of the image-sensing and printing system according to a fifth embodiment.

FIG. 13 shows the construction of the image-sensing and printing system according to the fifth embodiment. In FIG. 13, numeral 210 denotes an image sensing apparatus; 220, a printer which prints an image based on image data obtained by sensing and processed by the image sensing apparatus 210 on a print sheet; 230, a transmission path connecting the image sensing apparatus 210 with the printer 220.

In the image sensing apparatus 210, numeral 211 denotes an image sensing unit which image-senses an object; 212, a camera-signal processor which processes a video image signal obtained by sensing by the image sensing unit 211 and outputs video image data; 213, a memory for storing the video image data and storing form data to be described later; and 214, an image processor which converts the video image data in the memory 213 into data in the format indicated by the form data, and generates and outputs print data in format printable by the printer 220. The image processor 214 includes a CPU for controlling the overall image sensing apparatus 210. Numeral 215 denotes an input unit for selecting form data for the image processor 214; 216, a display unit which displays necessary data; and 217, an I/F unit which outputs the print data onto the transmission path 230.

In the printer 220, numeral 221 denotes an I/F unit which receives the print data via the transmission path 230; and 222, a printing unit which prints an image based on the print data on a print sheet.

The form data is format data indicating the format for printing a sensed video image based on video image data. The form data includes data on the output position of the sensed video image and data on other decorative information.

Figure 17:
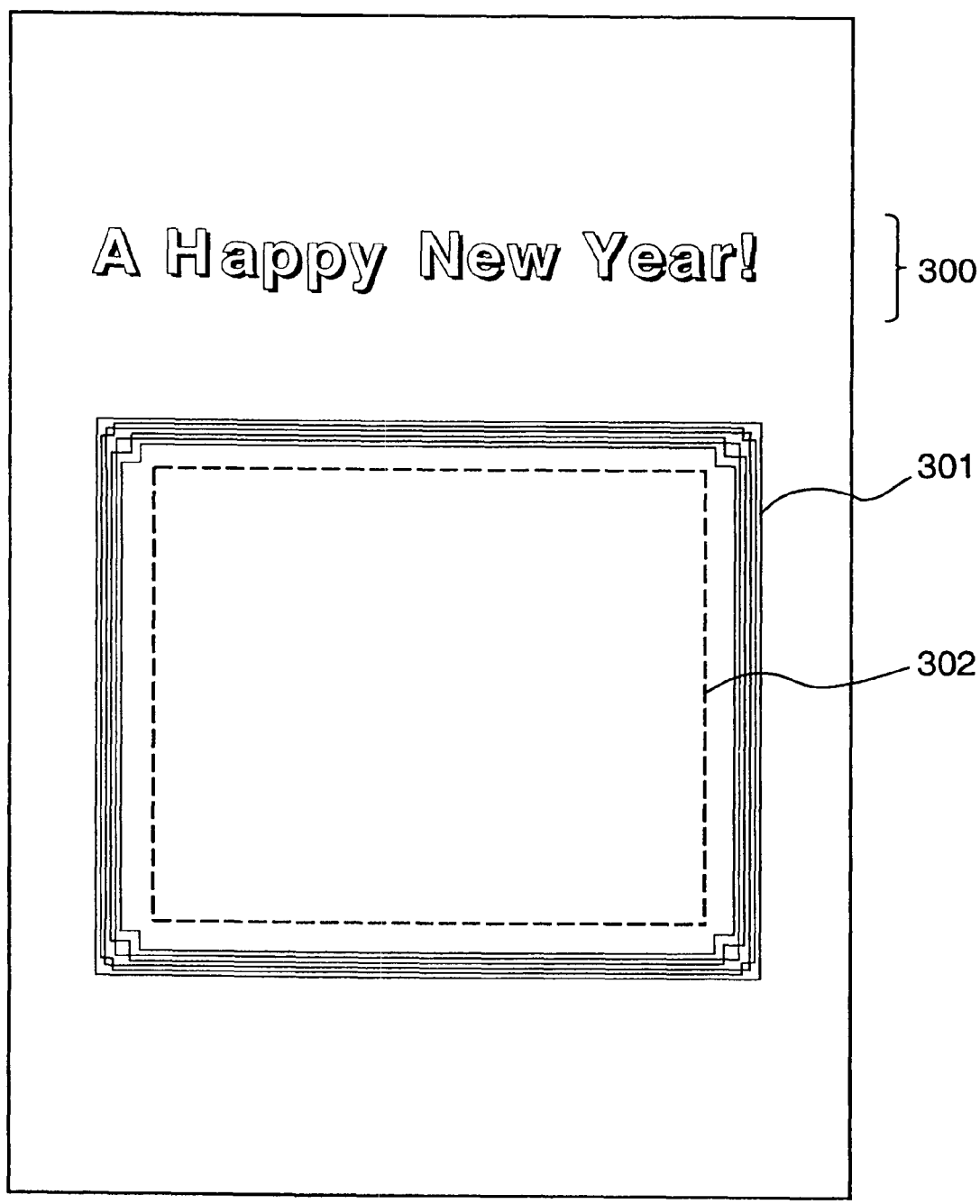
FIG. 17 is a display example of the form data of the fifth embodiment.

FIG. 17 shows a display example of the form data. In FIG. 17, numerals 300 and 301 respectively denote the decorative information. The data 300 is character-string data; the data 301, line-figure data; and 302, area data indicating an area where the video image is to be inserted. In image printing, the broken line represented by the area data 302 in FIG. 17 is not actually printed.

In the memory 213, the data indicating the format as described above is stored in a form-data storage area. The form-data storage area has a structure as shown in FIG. 18.

In the present embodiment, as a plurality of form data are stored, the respective data must be uniquely specified. As shown in FIG. 18, each form data has its form data number ("1", "2" . . . In FIG. 18) and its format data.

Figure 18:
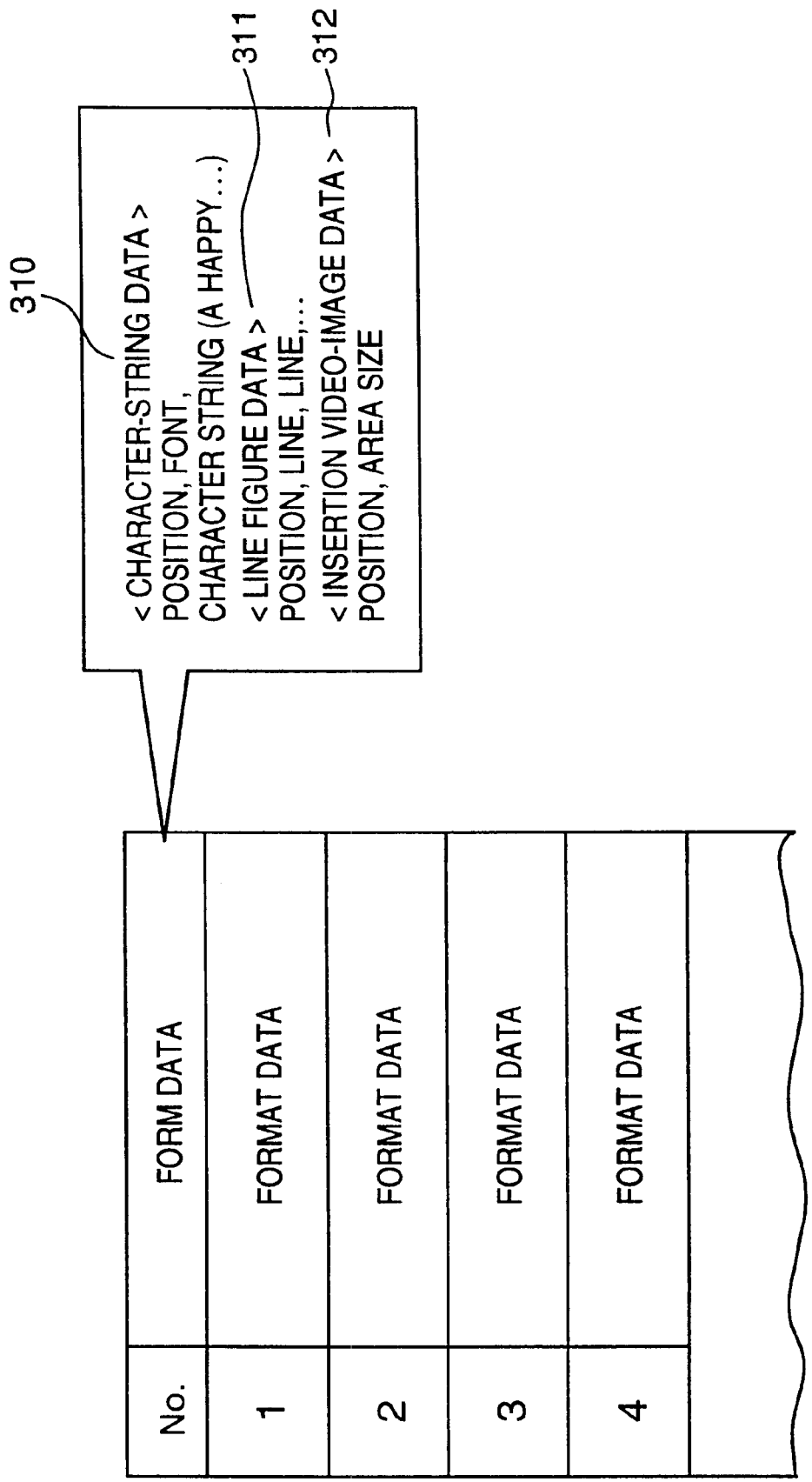
FIG. 18 shows the format of the form data of the fifth embodiment.

In FIG. 18, the format data has delimiters 310 to 312 for different formats. The format following one delimiter can be discriminated by examining the delimiter. For example, after the delimiter 310 indicating the format of character-string data, a character-string output position, a font name, and a character-string (one or more character codes) are stored. After the delimiter 311 indicating the format of line-figure data, a line-figure output position and line data are stored.

Note that besides the form data registered in advance in the memory 213, form data may be generated by a PC, for example, and downloaded via the I/F unit 217 into the memory 213 so as to be registered there.

In this case, an application program for generating form data is started on the PC. Then, the image sensing apparatus 210 is connected to the PC via the I/F unit 217. The form data received from the PC via the I/F unit 217 is registered into the memory 213.

Figure 19:
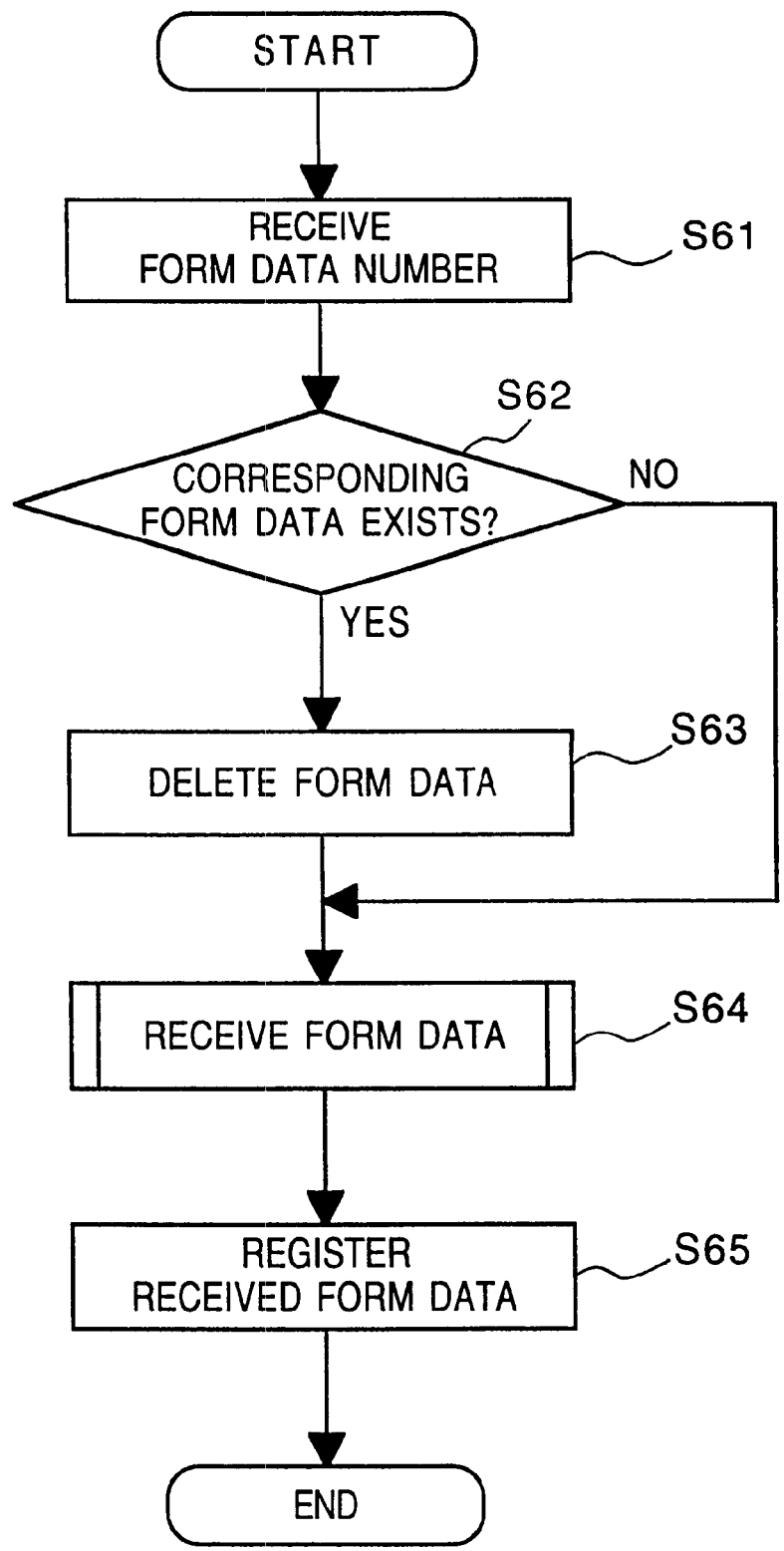
FIG. 19 is a flowchart showing a process procedure of downloading the form data.

The application program which runs on the PC has a function to determine an input character-string, a line figure to be drawn, and an area where a sensed video image is inserted, and generates data in the format as shown in FIG. 18, and has a function to transfer the data to the image sensing apparatus 210. The downloading in this case will be described with reference to FIG. 19.

Note that the process starts by operating a download switch provided in the input unit 215.

First, at step S61, a form data number transferred from the PC is received. At step S62, it is determined whether or not form data corresponding to the form data number has been already registered in the memory 213. If YES, i.e., it is determined that the form data is registered, the process proceeds to step S63 at which the data is deleted. Then at step S64, form data is received. At step S65, the received new form data is registered in the form-data storage area in the memory 213.

Next, print processing utilizing the form data will be described.

As described above, the form data stored in the memory 213 comprises data indicating the coordinates of area of print data in which video image data is inserted, character and line data other than sensed image data and the like. The video image data inserted into the print data is equal or similar to the original video image data. The memory 213 holds various types of such form data.

Figure 14:
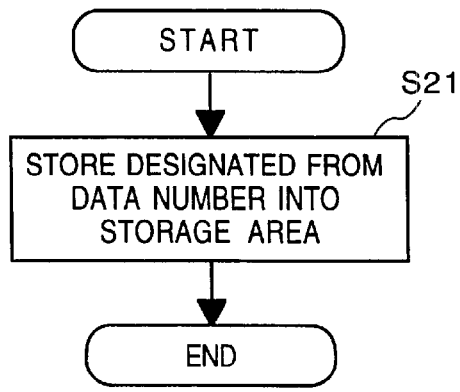
FIG. 14 is a flowchart showing process procedure of recording a form data number according to the fifth embodiment.
Figure 15:
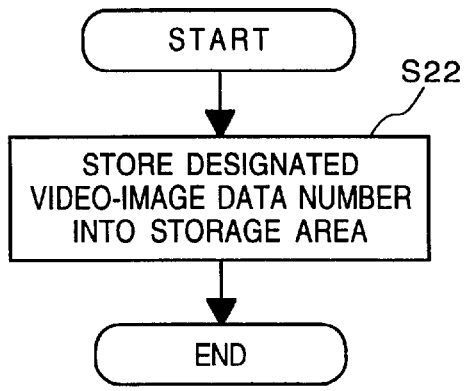
FIG. 15 is a flowchart showing process procedure of recording a video image data number according to the fifth embodiment.
Figure 16:
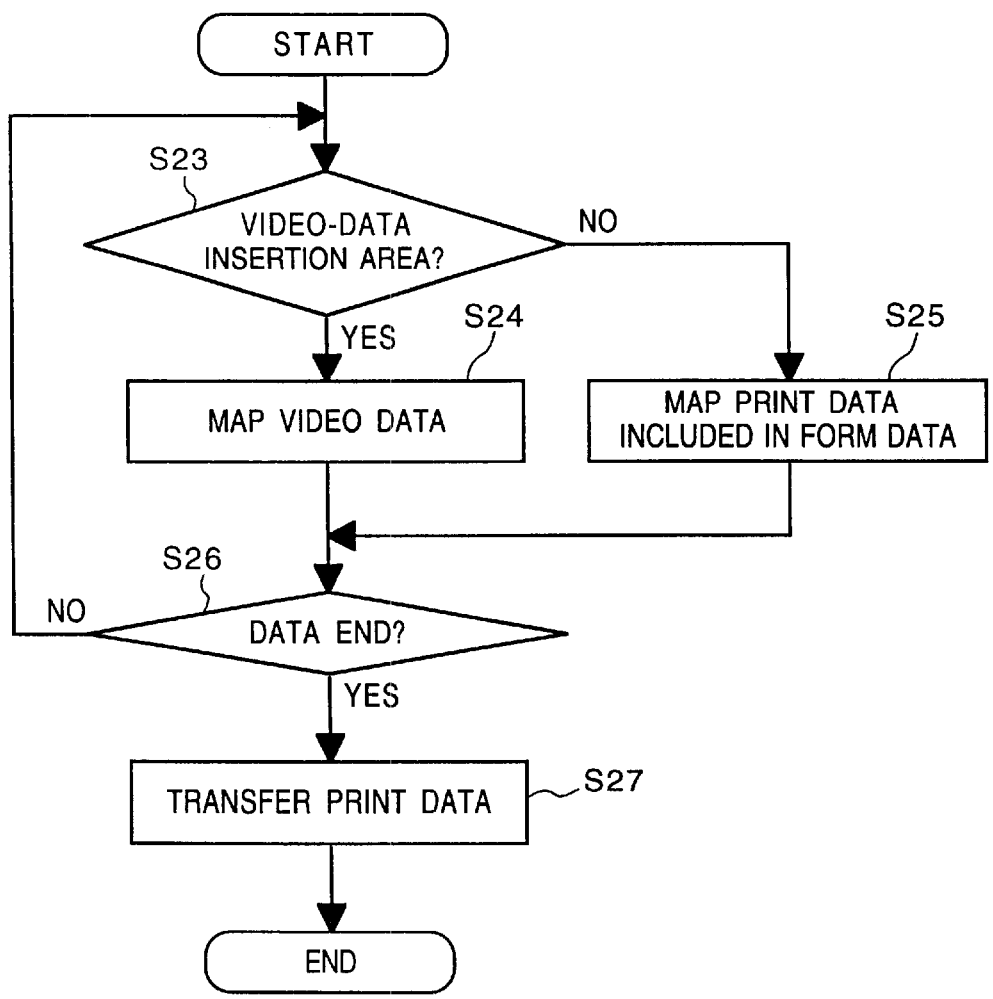
FIG. 16 is a flowchart showing a process procedure of printing according to the fifth embodiment.

Next, the actual processing will be described with reference to the flowcharts of FIGS. 14 to 16.

The video image data and form data stored in the memory 213 respectively have a video data identifier and a form data identifier, as identification information, each of which is stored into a storage area of the memory 213 when the data is selected by the user, so that the CPU of the image processor 214 is informed of the data designated by the user when a printing instruction is inputted. Hereinafter, these identifiers will be referred to as "form data number" and "video-image data number".

Upon printing, the user first selects form data by using the input unit 215. At this time, the CPU stores a form data number corresponding to the form data into a predetermined storage area of the memory 213 at step S21 in FIG. 14. Similarly, when the user designates video image data by using the input unit 215, the CPU stores a video-image data number corresponding to the video image data into a predetermined storage area of the memory 213 at step S22 in FIG. 15. These operations may be made any number of times, and in any order, before printing. Note that the content of data to be selected can be verified by using the display unit 216 by instructing to display the content from the input unit 215.

As printing has been instructed from the input unit 215, the CPU reads the form data number and video-image data number designated by the user, currently stored in the storage area. Next, the image processor 214 reads the form data and video data corresponding to the read form data number and video-image data number from the memory 213. Then print data in printer-interpretable form is generated by using the form data and video image data. In this print-data generating processing, image data is generated for a line, from the top to the bottom, temporarily in a print-output buffer area (not shown) of the memory 213. Accordingly it is necessary to determine whether or not an image developed at one-line position is a character (array), a line or a sensed video image. At step S23 in FIG. 16, video-image insertion area data, indicated by the designated form data, is compared with the position at which the print data is currently generated, and it is determined whether or not the current position corresponds with a video-image insertion area. If it is determined that the position is in the video-image insertion area, the process proceeds to step S24, at which the video image data is converted into the printer-interpretable form data, and mapped as print data. At this time, if the size of the video-image insertion area data included by the form data is different from the size of the video image data, the video image data is reduced or enlarged.

On the other hand, if it is determined at step S23 that the position is not in the video-image insertion area, the process proceeds to step S25, at which the data on character(s) and line(s) included in the form data is mapped as print data. The processing at steps S24 or S25 is repeated until it is determined at step S26 that all the data has been mapped. As the mapping has been completed, the process proceeds to step S27, at which the print data is transferred to the printer 220 via the I/F unit 217, the transmission path 230 and the I/F unit 221. In the printer 220, the printing unit 220 performs printing based on the print data.

Note that a communication protocol used for transferring the print data to the printer 220 is selected in accordance with the function of the printer 220 connected at that time. This is similar to the first embodiment therefore the explanation of the selection of protocol will be omitted.

In the above embodiment, it is assumed that the shape of the video image data to be inserted into the print data is equal or similar to the original video image data, however, the shape and the size of the video image data used for printing can be arbitrarily changed.

In such case, when printing is instructed, the shape of a video image area is calculated based on the video-image insertion area data of the form data. Then a frame having the shape of video image is displayed over the video image data for printing displayed on the display unit 216. The user changes the size and/or position of the frame by using the input unit 215, and instructs execution of printing. Thus, the shape of video image can be arbitrarily changed by mapping the video image data in the area selected at that time similarly to the above embodiment.

Further, in the above embodiment, the predetermined types of form data are provided on the image sensing apparatus, however, it may be arranged such that the image sensing apparatus has an I/F unit connecting the image sensing apparatus to a computer, and form data are generated on the computer. The generated form data are transferred to the image sensing apparatus via the I/F unit. This avoids limiting types of form data.

Further, in the above embodiment, after the all the print data has been mapped, the print data is transferred to the printer 220, however, in a case where all the data cannot be processed at once due to limitation on the image sensing apparatus 210 or the printer 220, mapping may be performed by a predetermined amount of data that can be transferred to the printer 220, and the mapping and data transfer may be repeated a plural number of times.

As described above, according to the present embodiment, the image sensing apparatus contains form data indicating printing format for the printer, so that video image data can be directly transferred to the printer, further, printing can be performed not only using the video image data but also using character data, line data and the like, included in the form data.

Further, by arranging such that form data, generated by an external device such as a computer, is transferred to the image sensing apparatus, printing in more various formats can be performed.

The present invention is not limited to the above embodiments and various changes and modifications can be made within the spirit and scope of the present invention. Therefore, to appraise the public of the scope of the present invention, the following claims are made.

What is claimed is:

1. A digital image-sensing apparatus comprising:

an image sensing unit for converting an optical image of an object into an electric image signal;

a conversion unit for converting the electric image signal into a digital image signal;

an interface unit for interfacing said digital image-sensing apparatus with an external printer; and a printer control module for controlling printing a sensed image based on the digital image signal by said external printer, wherein said printer control module includes
a CPU;
a memory;
a communication module for interpreting a communication protocol for communicating with said external printer via said interface unit and discriminating type of said external printer connected to said digital image-sensing apparatus, wherein said external printer and said digital image-sensing apparatus establish a communication link and said communication module determines the printer type;

a code generating module for generating codes that a printer of the type determined by said communication module can interpret;

a combined-multiple-image generating module for generating a combined-multiple-image signal from a plurality of image information stored in said digital image-sensing apparatus; and a digital image-sensing apparatus control module for transferring the combined-multiple-image signal to said external printer, in correspondence with a file name, and wherein said printer control module controls said external printer to print the combined-multiple-image.

2. An image sensing apparatus comprising:

an image-sensing unit for sensing an object;

a communication bus for performing communication with a printer;

a storage device for storing printing layout information on a relative position of an image, form data indicating a form of decorative information and other data for controlling said printer, by type of said printer to change the printing layout; and a control module for reading the printing layout information from said storage device in accordance with type information indicating the type of said printer, received via said communication bus, and transferring the printing layout information, the form data indicating the form of said decorative information and image information sensed by said image sensing unit to said printer via said communication bus.

3. A printer comprising:

a communication bus for performing communication with an image sensing apparatus;

a memory for storing type information indicating type of said printer;

a printing unit for printing an image based on image information received via said communication bus from said image sensing apparatus; and a control module for reading the type information from said memory and transferring the type information to said image sensing apparatus via said communication bus, receiving printing layout information on a relative position of an image, form data indicating a form of decorative information and other data and the image information transferred in correspondence with transfer by said control module from said image sensing apparatus and forwarding the image information and the form data indicating the form of said decorative information to said printing unit, and controlling said printing means based on the printing layout information.

* * * * *

UNITED STATES PATENT AND TRADEMARK OFFICE
CERTIFICATE OF CORRECTION

PATENT NO. : 6,603,506 B2
DATED : August 5, 2003
INVENTOR(S) : Yasuyuki Ogawa et al.

It is certified that error appears in the above-identified patent and that said Letters Patent is hereby corrected as shown below:

Column 3,
Lines 15, 29 and 46, "10$l$," should read -- 10$\ell$, --
Line 44, "10$l$" should read -- 10$\ell$ --

Column 4,
Line 50, "(S30$l$)" should read -- (S30$\ell$) --
Line 56, "10$l$" should read -- 10$\ell$ --

Column 5,
Lines 7, 12, 19 and 38, "10$l$," should read -- 10$\ell$, --

Column 6,
Line 2, "(S30$l$)." should read -- (S30$\ell$). --
Line 26, "10$l$," should read -- 10$\ell$, --
Line 65, "10$l$" should read -- 10$\ell$ --

Signed and Sealed this

Thirteenth Day of January, 2004

JON W. DUDAS
*Acting Director of the United States Patent and Trademark Office*